United States Patent
Lyons et al.

(10) Patent No.: US 8,802,751 B2
(45) Date of Patent: Aug. 12, 2014

(54) IMPACT-MODIFIED POLYCARBONATE/POLYESTER OR POLYCARBONATE/POLYAMIDE COMPOSITIONS

(75) Inventors: Jason M. Lyons, King of Prussia, PA (US); Stephane Girois, Norfolk, VA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/382,548

(22) PCT Filed: Jun. 9, 2010

(86) PCT No.: PCT/US2010/037884
§ 371 (c)(1),
(2), (4) Date: Jan. 6, 2012

(87) PCT Pub. No.: WO2011/008370
PCT Pub. Date: Jan. 20, 2011

(65) Prior Publication Data
US 2012/0108729 A1    May 3, 2012

Related U.S. Application Data

(60) Provisional application No. 61/226,460, filed on Jul. 17, 2009.

(51) Int. Cl.
| | | |
|---|---|---|
| C08L 83/00 | (2006.01) |
| C08K 3/04 | (2006.01) |
| C08F 283/02 | (2006.01) |
| C08L 77/00 | (2006.01) |
| C08L 69/00 | (2006.01) |
| C08L 67/02 | (2006.01) |
| C08L 51/00 | (2006.01) |
| C08L 51/04 | (2006.01) |
| C08L 23/08 | (2006.01) |

(52) U.S. Cl.
CPC ........ *C08L 67/02* (2013.01); *C08L 2205/035* (2013.01); *C08L 51/003* (2013.01); *C08L 51/04* (2013.01); *C08L 23/0846* (2013.01); *C08L 77/00* (2013.01); *C08L 69/00* (2013.01); *Y10S 977/742* (2013.01)
USPC ........... 523/201; 524/451; 524/495; 524/513; 524/523; 525/64; 525/70; 525/132; 525/445; 977/742

(58) Field of Classification Search
CPC ......... C08L 67/02; C08L 67/03; C08L 69/00; C08L 69/005; C08L 79/08; C08K 3/0008; C08K 3/0033
USPC ......... 525/468, 44, 165, 445, 185, 64–65, 70, 525/80, 132; 523/201; 524/495, 423, 451, 524/513; 977/742
See application file for complete search history.

(56) References Cited

U.S. PATENT DOCUMENTS

| | | | |
|---|---|---|---|
| 6,809,151 B1 * | 10/2004 | Lacroix et al. ............. | 525/64 |
| 7,015,261 B1 | 3/2006 | Zerafati et al. | |
| 7,119,152 B1 * | 10/2006 | Lacroix et al. ............ | 525/445 |
| 2005/0085589 A1 * | 4/2005 | Kim .......................... | 525/67 |
| 2006/0142455 A1 | 6/2006 | Agarwal et al. | |
| 2006/0205895 A1 * | 9/2006 | Gaggar et al. ............. | 525/468 |
| 2007/0066743 A1 | 3/2007 | Rogunova et al. | |
| 2007/0282034 A1 | 12/2007 | Patel et al. | |
| 2008/0246181 A1 | 10/2008 | Zhu et al. | |

FOREIGN PATENT DOCUMENTS

| | | |
|---|---|---|
| EP | 0 531 008 A1 | 3/1993 |
| JP | 2009-302211 A2 | 12/2009 |

* cited by examiner

*Primary Examiner* — Hannah Pak
(74) *Attorney, Agent, or Firm* — Lynn B. Morreale

(57) ABSTRACT

The invention relates to impact-modified polymer compositions, containing a polymer blend of polycarbonate with polyester and/or polyamide, plus an impact modifier blend of core/shell and functional polyolefin impact modifiers. The impact modifiers can provide the polymer blend composition with improved impact strength at equivalent loading, and also allow for higher amounts of polyester and/or polyamide in the blend without sacrificing impact strength.

5 Claims, 3 Drawing Sheets

75/25 PC/PET Blend

50/50 PC/PET Blend

IMPACT-MODIFIED POLYCARBONATE/POLYESTER OR POLYCARBONATE/POLYAMIDE COMPOSITIONS

FIELD OF THE INVENTION

The invention relates to impact-modified polymer compositions, containing a polymer blend of polycarbonate with polyester and/or polyamide, plus an impact modifier blend of core/shell and functional polyolefin impact modifiers. The impact modifiers can provide the polymer blend composition with improved impact strength at equivalent loading, and also allow for higher amounts of polyester and/or polyamide in the blend without sacrificing impact strength.

BACKGROUND OF THE INVENTION

Polycarbonate is a widely used polymeric material, due to its high level of heat resistance, dimensional stability, and ease of molding. To improve other performance properties such as chemical resistance and/or reduce the cost, other polymers, such as polyamides and polyesters can be blended with the polycarbonate.

US 2007/0066743 describes blends of polycarbonate and polyester using a vulcanizate along with an optional core/shell modifier and optional linear terpolymers to improve the impact resistance.

U.S. Pat. No. 7,015,261 discloses polyester and polycarbonate blends containing both a linear polyethylene having epoxy groups and an acrylic-based core/shell impact modifier. Acrylic core, core/shell impact modifiers provide less low temperature impact resistance than other types of impact modifiers.

U.S. Pat. No. 7,119,152 describes impact-modified polyesters having core/shell impact modifiers and ethylene epoxide copolymers. The polyester may contain up to 30 percent of polycarbonate or copolyetherester. The ratio of core/shell to ethylene epoxide copolymer is either a) 60-90/40-10 if 18-40% combined impact modifiers is present, and 60-75/40-25 when 2-18% of the combined impact modifiers are present.

It has now been found that blends of polycarbonate with higher levels of polyester and/or polyamide can provide good impact strength, when blended with the proper blend of core/shell and functional polyolefin impact modifiers.

SUMMARY OF THE INVENTION

The invention relates to a thermoplastic polyester/polycarbonate composition comprising
a) from 40 to 98 weight percent of a polymer blend comprising
  1) 5 to 65 weight percent of one or more polyesters and/or polyamides; and
  2) 35 to 95 weight percent of polycarbonate;
b) from 2 to 60 weight percent an impact modifier blend comprising
  1) a core-shell copolymer; and
  2) a functionalized polyolefin,
based on the total weight of the polymer blend plus the impact modifier blend.

The invention further relates to a thermoplastic polyester/polycarbonate composition comprising:
a) from 40 to 98 weight percent of a polymer blend based on the total weight of the polymer blend plus the impact modifier blend, comprising
  1) 25 to 65 weight percent of one or more polyesters and/or polyamides based on the total weight of the polymer blend; and
  2) 35 to 75 weight percent of polycarbonate based on the total weight of the polymer blend; and
b) from 2 to 60 weight percent an impact modifier blend based on the total weight of the polymer blend plus the impact modifier blend, comprising
  1) 1 to 70 weight percent, and preferably 1 to less than 50 weight percent, of a core-shell copolymer based on the total weight of the impact modifier blend; and
  2) from 50 to 99 weight percent a functionalized polyolefin based on the total weight of the impact modifier blend.

DETAILED DESCRIPTION OF THE INVENTION

Figure 1:
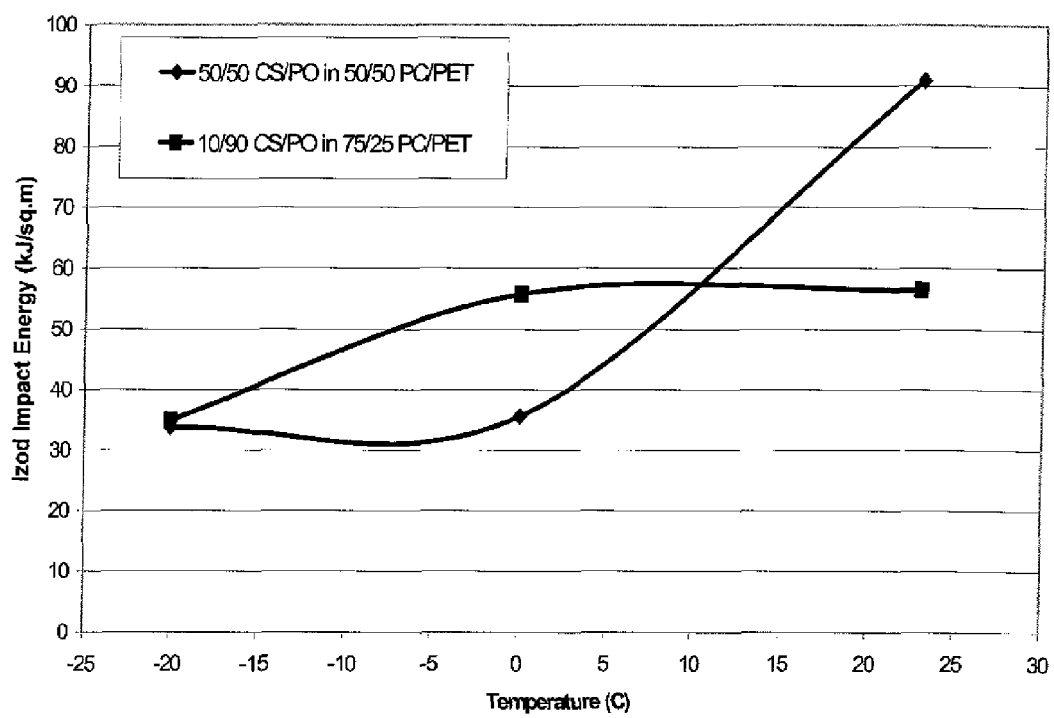
FIG. 1: Is a plot of impact resistance versus temperature showing that a 50:50 polycarbonate/PET blend can have the same impact resistance, depending on the ratio of core-shell polymer to functional polyolefin in the impact modifier blend.
Figure 2:
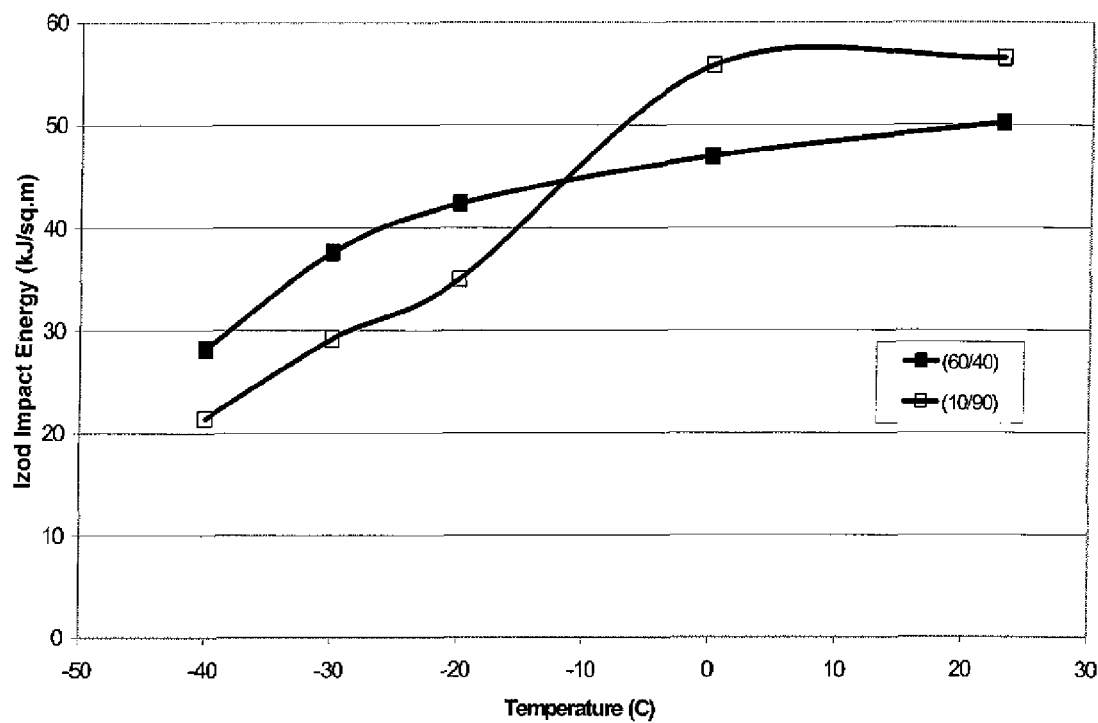
FIG. 2: Is a plot of impact resistance versus temperature for a 75/25 polycarbonate/PET blend showing the change in impact resistance based on the ratio of core-shell polymer to functional polyolefin in the impact modifier blend.
Figure 3:
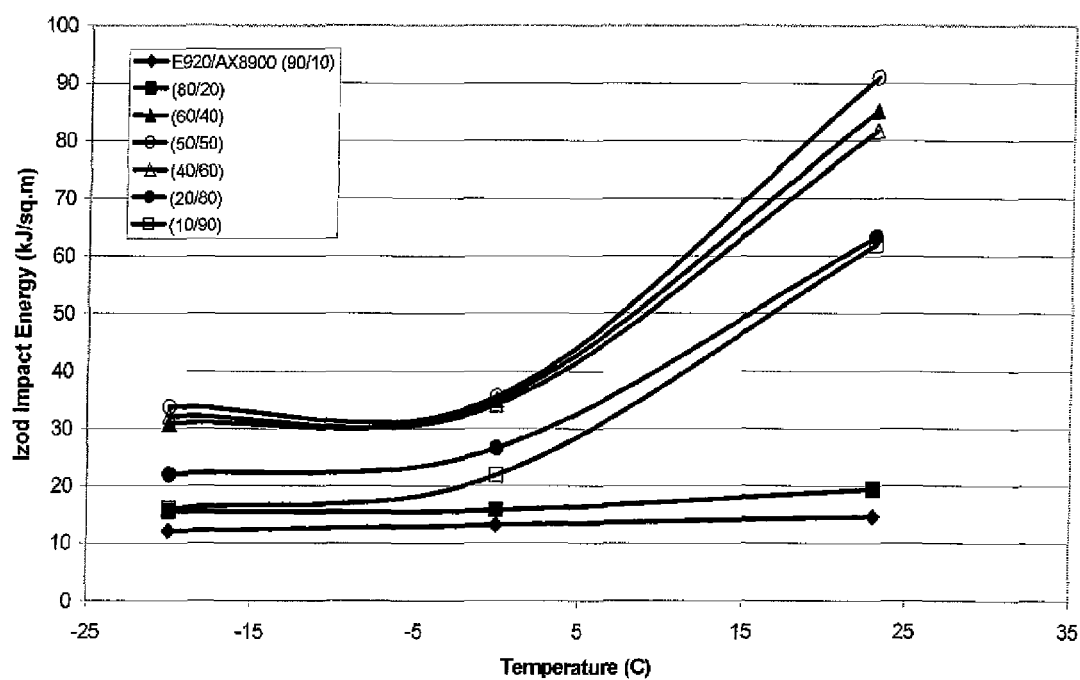
FIG. 3: Is a plot of impact resistance versus temperature for a 50:50 polycarbonate/PET blend with different ratios of core-shell polymer to functional polyolefin in the impact modifier blend.

The invention relates to an impact modified polymer blend, where the polymer blend contains polycarbonate with polyester and/or polyamide, and the impact modifier is a blend of core/shell and functional polyolefin impact modifiers.
Polycarbonate The polycarbonate (PC) of the invention is a polyester of carbonic acid, obtained by the reaction of at least one carbonic acid derivative with at least one aromatic or aliphatic diol. The preferred aromatic diol is bisphenol A, which reacts with phosgene or else, by transesterification, with ethyl carbonate. It can be a homopolycarbonate or copolycarbonate based on a bisphenol of formula HO—Z—OH for which Z denotes a divalent organic radical which has from 6 to 30 carbon atoms and which comprises one or more aromatic group(s). Examples of diphenols include, but are not limited to dihydroxybiphenyls, bis(hydroxyphenyl)alkanes, bis(hydroxyphenyl)cycloalkanes, indanebisphenols, bis(hydroxyphenyl)ethers, bis(hydroxyphenyl)ketones, bis(hydroxyphenyl)sulphones, bis(hydroxyphenyl)sulphoxides, and α,α'-bis(hydroxyphenyl)diisopropylbenzenes.

The polycarbonate can also be a derivative obtained by alkylation or halogenation of the aromatic ring. Among the compounds of formula HO—Z—OH, are the following compounds: hydroquinone, resorcinol, 4,4'-dihydroxybiphenyl, bis(4-hydroxyphenyl)sulphone, bis(3,5-dimethyl-4-hydroxyphenyl)methane, bis(3,5-dimethyl-4-hydroxyphenyl)sulphone, 1,1-bis(3,5-dimethyl-4-hydroxyphenyl)-para/meta-isopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane (or bis-phenol A), 2,2-bis(3-chloro-4-hydroxyphenyl)propane, 2,2-bis(3,5-dibromo-4-hydroxyphenyl)propane, 2,4-bis(4-hydroxyphenyl)-2-methylbutane, 2,4-bis(3,5-dimethyl-4-hydroxyphenyl)-2-methylbutane, α,α'-bis(4-hydroxyphenyl)-o-diisopropylbenzene, α,α'-bis(4-hydroxyphenyl)-m-diisopropylbenzene (or bisphenol M).

The preferred polycarbonates are the homopolycarbonates based on bisphenol A or 1,1-bis(4-hydroxyphenyl)-3,3,5-trimethylcyclohexane and the copolycarbonates based on bisphenol A and 1,1-bis(4-hydroxyphenyl)-3,3,5-trimethylcyclohexane. The polycarbonate generally has a weight average molecular weight of 10,000 to 200,000.

Polyester

The term "polyester" or "thermoplastic polyester" denotes polymers that are saturated products coming from the condensation of glycols and of dicarboxylic acids, or of their derivatives. Preferably, they comprise the products of the condensation of aromatic dicarboxylic acids having from 8 to 14 carbon atoms and of at least one glycol chosen from the group consisting of neopentyl glycol, cyclohexanedimethanol and aliphatic glycols of formula $HO(CH_2)_nOH$ in which n is an integer ranging from 2 to 10. Up to 50 mol % of the aromatic dicarboxylic acid may be replaced with at least one other aromatic dicarboxylic acid having from 8 to 14 carbon atoms, and/or up to 20 mol % may be replaced with an aliphatic dicarboxylic acid having from 2 to 12 carbon atoms.

The preferred polyesters are polyethylene terephthalate (PET), poly(1,4-butylene)terephthalate (PBT), 1,4-cyclohexylene dimethylene terephthalate/isophthalate) and other esters derived from aromatic dicarboxylic acids such as isophthalic acid, dibenzoic acid, naphthalene dicarboxylic acid, 4,4'-diphenylenedicarboxylic acid, bis(p-carboxyphenyl)methane acid, ethylene bis(p-benzoic) acid, 1,4-tetramethylene bis(p-oxybenzoic) acid, ethylene bis(para-oxybenzoic) acid, 1,3-trimethylene bis(p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol.

In one embodiment the polyester is polylactic acid, either alone or blended with other polyesters or polyamides.

It would not be outside of the scope of the invention if the polyesters consisted of several diacids and/or several diols. It is also possible to use a blend of various polyesters. The polyesters could also contain copolyetheresters. These copolyetheresters are copolymers containing polyester blocks and polyether blocks having polyether units derived from polyetherdiols such as polyethylene glycol (PEG), polypropylene glycol (PPG) or polytetramethylene glycol (PTMG), dicarboxylic acid units such as terephthalic acid units, and short, chain-extender, diol units such as glycol (ethanediol) or 1,4-butanediol. The linking of the polyethers with the diacids forms the flexible segments whereas the linking of the glycol or butanediol with the diacids forms the rigid segments of the copolyetherester. These copolyetheresters are thermoplastic elastomers. The proportion of these copolyetheresters may represent up to 30 parts per 100 parts of thermoplastic polyester.

Polyamide

The polyamides of the invention are products resulting from the poly condensation:
of one or more amino acids, such as aminocaproic, 7-aminoheptanoic, 11-aminoundecanoic and 12-aminododecanoic acid or of one or more lactams, such as caprolactam, oenantholactam and lauryllactam;
of one or more salts or mixtures of diamines such as hexamethylenediamine, dodecamethylenediamine, metaxylenediamine, bis(p-aminocyclohexyl)methane and trimethylhexamethylenediamine with diacids such as isophthalic, terephthalic, adipic, azelaic, suberic, sebacic and dodecanedicarboxylic acids.

As examples of polyamides, mention may be made of PA-6, PA-6,6, PA-11 and PA-12.

It may also be advantageous to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid.

As examples of lactams, mention may be made of those which have from 3 to 12 carbon atoms on the main ring and are possibly substituted. Mention may be made, for example, of β,β-dimethylpropriolactam, α,α-dimethylpropriolactam, amylolactam, caprolactam, capryllactam and lauryllactam.

As examples of alpha, omega-aminocarboxylic acids, mention may be made of aminoundecanoic acid and aminododecanoic acid. As examples of dicarboxylic acids, mention may be made of adipic acid, sebacic acid, isopthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid $HOOC-(CH_2)_{10}-COOH$.

The diamine may be an aliphatic diamine having from 6 to 12 carbon atoms; it may be a saturated cyclic and/or arylic diamine. As examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM), and bis(3-methyl-4-aminocyclohexyl)methane (BMACM).

As examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA 6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-amino undecanoic acid, adipic acid and hexamethylenediamine (PA-6/6,6/11/12), and copolymers of lauryllactam, azelaic acid and hexamethylenediamine (PA-6,9/12).

The polyamide could be also of formula X.X/Z or 6.Y2/Z in which:
X denotes the residues of an aliphatic diamine having from 6 to 10 carbon atoms,
Y denotes the residues of an aliphatic dicarboxylic acid having from 10 to 14 carbon atoms,
Y2 denotes the residues of an aliphatic dicarboxylic acid having from 15 to 20 carbon atoms and
Z denotes at least one unit chosen from the residues of a lactam, the residues of an α,ω-aminocarboxylic acid, the unit X1, Y1 in which X1 denotes the residues of an aliphatic diamine and Y1 denotes the residues of an aliphatic dicarboxylic acid, the weight ratios $Z/(X+Y+Z)$ and $Z/(6+Y2+Z)$ being between 0 and 15%

It is also possible to use polyamide blends. Advantageously, the relative viscosity of the polyamides, measured as a 1% solution in sulphuric acid at 20° C., is between 1.5 and 5.

The polyamide, could also include copolymers having polyamide blocks and polyether blocks. These result from the copolycondensation of polyamide blocks having reactive ends with polyether blocks having reactive ends, such as:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;
3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

Core/Shell

The polymer composition of the invention contains a blend of core/shell and functional polyolefin impact modifiers.

The core-shell copolymer is in the form of fine particles having an elastomer core and at least one thermoplastic shell, the particle size being generally less than 1 micron and advantageously between 150 and 500 nm, and preferably from 200 nm to 450 nm. The core-shell copolymers may be monodisperse or polydisperse. By way of example of the core, mention may be made of isoprene homopolymers or butadiene homopolymers, copolymers of isoprene with at most 3 mol % of a vinyl monomer and copolymers of butadiene with at most 35 mol % of a vinyl monomer, and preferable 30 mol % or less. The vinyl monomer may be styrene, an alkylstyrene, acrylonitrile or an alkyl(meth)acrylate. Another core family consists of the homopolymers of an alkyl (meth)acrylate and the copolymers of an alkyl(meth)acrylate with at most 35 mol % of a vinyl monomer, and preferable 30 mol % or less. The alkyl(meth)acrylate is advantageously butyl acrylate. The vinyl monomer may be styrene, an alkylstyrene, acrylonitrile, butadiene or isoprene. The core of the copolymer may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shell(s) are styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (A) having a polystyrene shell and core-shell copolymers (A) having a PMMA shell. The shell could also contain functional or hydrophilic groups to aid in dispersion and compatibility with different polymer phases. There are also core-shell copolymers (A) having two shells, one made of polystyrene and the other, on the outside, made of PMMA. Examples of copolymers (A) and their method of preparation are described in the following U.S. Pat. Nos. 4,180,494, 3,808,180, 4,096,202, 4,260,693, 3,287,443, 3,657,391, 4,299,928 and 3,985,704.

Advantageously, the core represents, by weight, 70 to 90% of the core-shell polymer, and the shell represents 30 to 10%.

In one embodiment of the invention, the core-shell impact modifier consists of (i) of 75 to 80 parts of a core comprising at least 93 mol % of butadiene, 5 mol % of styrene and 0.5 to 1 mol % of divinylbenzene and (ii) of 25 to 20 parts of two shells essentially of the same weight, the inner one made of polystyrene and the outer one made of PMMA. An MBS (methacrylate, butadiene, styrene) core shell polymer would be included.

In another embodiment, the core-shell impact modifier is an all acrylic impact modifier (AIM) having an alkyl(meth)acrylate core and an alkyl(meth)acrylate shell.

Functionalized Polyolefin

The polymer composition contains functionalized polyolefin impact modifiers in addition to the core-shell modifier. The functionality provides a means of anchoring the polyolefin in the polyester or polyamide phases. Preferred functionalities are epoxide for use with polyesters and anhydrides, such as maleic anhydride, for use with polyamides. Other functionalities may also be employed.

Acid anhydride copolymers may be polyolefins grafted by an unsaturated carboxylic acid anhydride or ethylene-unsaturated carboxylic acid anhydride copolymers which are obtained, for example, by radical polymerization. The unsaturated carboxylic acid anhydride may be chosen, for example, from maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methylbicyclo[2.2.1]hept-5-ene-2,2-dicarboxylic anhydrides. Advantageously, maleic anhydride is used. It would not be outside the scope of the invention to replace all or part of the anhydride with an unsaturated carboxylic acid such as, for example, (meth)acrylic acid.

The polyolefin onto which the unsaturated carboxylic acid anhydride is grafted, may be a homopolymer or copolymer, and is preferably a polyethylene homopolymer or copolymer. Examples of useful comonomers include, but are not limited to alpha-olefins, advantageously those having from 3 to 30 carbon atoms; such as those composed of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docosene, 1-tetracocene, 1-hexacocene, 1-octacocene and 1-triacontene; these alpha-olefins may be used separately or as a mixture of two or more of them; esters of unsaturated carboxylic acids, such as, for example, alkyl (meth)acrylates, the alkyls possibly having up to 24 carbon atoms; examples of alkyl acrylates or methacrylates are especially methyl methacrylate, ethyl acrylate, n-butyl acrylate, isobutyl acrylate and 2-ethylhexyl acrylate; vinyl esters of saturated carboxylic acids, such as, for example, vinyl acetate or vinyl propionate; and dienes such as, for example, 1,4-hexadiene. A polyethylene copolymer may include several of the above comonomers.

Advantageously, the polyethylene, which may be a blend of several polymers, comprises at least 50 mol % and preferably 75 mol % of ethylene and its density may be between 0.86 and 0.98 g/cm$^3$. The MFI (Melt Flow Index at 190° C. at 2.16 kg) is advantageously between 0.1 and 1000 g/10 min.

Useful polyethylenes, include: low-density polyethylene (LDPE), high-density polyethylene (HDPE), linear low-density polyethylene (LLDPE), very low-density polyethylene (VLDPE), polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal.

Also included are EPR (ethylene-propylene-rubber) elastomers; EPDM (ethylene-propylene-diene) elastomers; and blends of polyethylene with an EPR or an EPDM; ethylene-alkyl(meth)acrylate copolymers possibly containing up to 60%, and preferably 2 to 40%, by weight of (meth)acrylate.

With regard to the ethylene-unsaturated carboxylic acid anhydride copolymers, that is to say those in which the unsaturated carboxylic acid anhydride is not grafted, these are copolymers of ethylene, the unsaturated carboxylic acid anhydride and, optionally another monomer which may be chosen from the comonomers that were mentioned above in the case of the ethylene copolymers intended to be grafted.

Advantageously, ethylene-maleic anhydride copolymers and ethylene-alkyl (meth)acrylate-maleic anhydride copolymers are used. These copolymers comprise from 0.2 to 10% by weight of maleic anhydride and from 0 to 40%, preferably 5 to 40%, by weight of alkyl(meth)acrylate. Their MFIs are between 0.5 and 200 (190°C./2.16 kg). The alkyl(meth)acrylates have already been described above. It is possible to use a blend of several copolymers, and it is also possible to use an ethylene-maleic anhydride copolymer/ethylene-alkyl(meth)acrylate-maleic anhydride copolymer blend.

With regard to the ethylene-unsaturated epoxide copolymers (B2), these may be obtained by the copolymerization of ethylene with an unsaturated epoxide or by grafting the unsaturated epoxide to the polyethylene. The grafting may be carried out in the solvent phase or onto the polyethylene in the melt in the presence of a peroxide. These grafting techniques are known per se. With regard to the copolymerization of ethylene with an unsaturated epoxide, it is possible to use so-called radical polymerization processes usually operating at pressures between 200 et 2500 bar.

Examples of unsaturated epoxides, include aliphatic glycidyl esters and ethers, such as allyl glycidyl ether, vinyl glycidyl ether, glycidyl maleate, glycidyl itaconate, glycidyl acrylate and glycidyl methacrylate; and alicyclic glycidyl esters and ethers, such as 2-cyclohex-1-ene glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

With regard to grafting, the copolymer is obtained by grafting an ethylene homopolymer or copolymer as described above, except that an epoxide is grafted instead of an anhydride. With regard to copolymerization, this is also similar to above except that an epoxide is used; it may also have other comonomers.

The product is advantageously an ethylene-alkyl(meth)acrylate-unsaturated epoxide copolymer or an ethylene-unsaturated epoxide copolymer. Advantageously, it may contain up to 40%, preferably 5 to 40%, by weight of alkyl(meth)acrylate and up to 10%, preferably 0.1 to 8%, by weight of unsaturated epoxide. Advantageously, the epoxide is glycidyl (meth)acrylate.

Advantageously, the alkyl(meth)acrylate is chosen from methyl (meth)acrylate, ethyl acrylate, n-butyl acrylate, isobutyl acrylate and 2-ethylhexyl acrylate. The amount of alkyl (meth)acrylate is advantageously from 20 to 35%. The MFI is advantageously between 0.5 and 200 (in g/10 min. at 190° C./2.16 kg). It is possible to use a blend of several copolymers, and it is also possible to use an ethylene-alkyl (meth)acrylate-unsaturated epoxide copolymer/ethylene-unsaturated epoxide copolymer blend.

The impact modified polymer composition of the invention contains from 2-60 weight percent, preferably 4-40, more preferably 5-25 of the impact modifier blend, and from 40 to 98 weight percent, preferably 60-96, more preferably 75-95 of the polymer blend, based on the total weight of the impact modifiers and polycarbonate, polyester and polyamide. Other components may also be present in the polymer composition at levels of from 0.25 to 30, preferably 0.5 to 20. The other components, include but not limited to glass fiber, glass beads, organic filler, inorganic filler, talc, dyes, pigments, UV absorber, processing aids, carbon nanotubes, and carbon black.

The blend of polycarbonate with polyamide and/or polyesters can contain from 1 to 95 percent by weight of polycarbonate and from 1 to 95 percent by weight of polyester and/or polyamide. Preferably the ratio is 50-50 to 90-10.

A useful polymer blend is one having from 35 to 95 by weight of polycarbonate. When the blend contains high levels (65-95, and preferably 70-95 weight percent) of polycarbonate, it is preferred that the impact modifier blend comprise from 50 to 99 weight percent of core-shell impact modifier.

It was found that when the level of polyester and/or polyamide is greater than 25 weight percent, and preferable greater than 30 weight percent that it is preferable if the impact modifier blend contain from 50 to 99 percent by weight, and preferably from 55 to 95 percent by weight of functionalized polyolefin.

The polymer composition of the invention can be produced by blending the components in several different ways. The individual components may be combined in any order, and may be blended with each other in any order before combining with other ingredients. The blending may take place separately prior to entering the hopper of an extruder, or the blending may take place in the hopper or extruder.

Blends of polycarbonate and polyesters or polyamides will undergo some degree of transesterfication when combined. While a small degree of transesterfication aids in compatibilization of the two polymers, left unchecked the too much transesterfication can lead to a degradation of the blend properties. Typically, the transesterfication is controlled by the addition of an inhibitor after a useful amount of transesterfication has occurred.

In one embodiment the functional polyolefin and core-shell modifier can be blended and pre-formed into pellets for ease of handling. These pallets can then be blended with the resin at the hopper.

In another embodiment, the core-shell modifier and/or functional polyolefin can be introduced separately or together at a point in the extruder that is downstream from the introduction of the polycarbonate and polyamide and/or polyester resins. The down-stream addition to the less viscous resin melt can improve the homogeneity of the mixing of resin and impact modifiers.

The impact-modified polymer compositions of the invention, have improved impact strength at equivalent loading to conventional polymer compositions, and also allow for higher amounts of polyester and/or polyamide in the blend without sacrificing impact strength.

It was found that equivalent toughening could be obtained in a 75/25 PC/PET blend as with a 50/50 PC/PET blend by simply adjusting the ratio of the two impact modifiers during compounding.

What is claimed is:

1. A thermoplastic polyester/polycarbonate composition consisting essentially of:
   a) 40 to 98 weight percent of a polymer blend based on the total weight of the polymer blend plus the impact modifier blend, said polymer blend consisting of:
      1) 5 to 65 weight percent of one or more polyesters and/or polyamides based on the total weight of the polymer blend, said polyester selected from the group consisting of polyethylene terephthalate (PET), polybutylene terephthalate (PBT), polyethylene naphthalate (PEN) and mixtures thereof (ii); and
      2) 65 to 95 weight percent of polycarbonate based on the total weight of the polymer blend;
   b) 2 to 60 weight percent an impact modifier blend based on the total weight of the polymer blend plus the impact modifier blend, comprising
      a. 50 to 99 weight percent of a core-shell copolymer based on the total weight of the impact modifier blend; and
      b. 1 to 50 weight percent of a functionalized polyolefin based on the total weight of the impact modifier blend, and
   c) optionally from 0.25 to 30 weight percent, based on the total thermoplastic composition of one or more components selected from the group consisting of glass fiber, glass beads, organic filler, inorganic filler, talc, dyes, pigments, UV absorber, processing aids, carbon nanotubes, and carbon black.

2. The thermoplastic composition of claim 1, wherein said core-shell copolymer comprises an elastomeric core and has a particle size between 150 and 500 nm.

3. The thermoplastic composition of claim 1, wherein said core comprises at least 65 percent by weight of one or more diene monomer units.

4. The thermoplastic composition of claim 1, wherein said core-shell copolymer is an all-acrylic copolymer.

5. The thermoplastic composition of claim 1, wherein said polymer blend makes up from 60 to 96 weight percent, and the impact modifier blend makes up from 4 to 40 weight percent of the total weight of the polymer blend and impact modifier blend.

* * * * *